United States Patent [19]

van Cauter et al.

[11] Patent Number: 4,628,205
[45] Date of Patent: Dec. 9, 1986

[54] REGIONLESS MULTIPLE LABEL SCINTILLATION COUNTING

[75] Inventors: Gustav C. van Cauter, Batavia; Leroy J. Everett, Glen Ellyn; Stanley J. DeFilippis, Naperville, all of Ill.

[73] Assignee: Packard Instrument Company, Inc., Downers Grove, Ill.

[21] Appl. No.: 721,264

[22] Filed: Apr. 8, 1985

[51] Int. Cl.$^4$ .............................................. G01T 1/20
[52] U.S. Cl. ................................. 250/361 R; 250/364; 250/328
[58] Field of Search ................... 250/361 R, 328, 364, 250/432 R

[56] References Cited

U.S. PATENT DOCUMENTS

| | | | |
|---|---|---|---|
| 3,715,584 | 2/1973 | Rosenstingl | 250/328 |
| 4,029,401 | 6/1977 | Nather | 250/328 |
| 4,085,325 | 4/1978 | Atallah et al. | 250/328 |
| 4,555,629 | 11/1985 | Everett et al. | 250/328 |

OTHER PUBLICATIONS

*The Tri-Carb 460C Automatic Liquid Scintillation System by Packard Operation Manual*, Section 3, 1980, pp. 3-1 to 3-20.
Kobayashi, Y. and D. V. Maudsley, *Practical Aspects of Double Isotope Counting*, pp. 76-85.
Bush, Elizabeth T., *Liquid Scintillation Counting of Doubly-Labelled Samples*, from *Analytical Chemistry*, vol 36, May 1964, pp. 1082-1089.
Herberg, R. J., "Statistical Aspects of Double Isotope Liquid Scintillation Counting by Internal Standard Technique", *Analytical Chemistry*, vol. 36, May 1964, pp. 1079-1082.

*Primary Examiner*—Craig E. Church
*Assistant Examiner*—David P. Porta
*Attorney, Agent, or Firm*—Leydig, Voit & Mayer

[57] ABSTRACT

Apparatus and a regionless method of ascertaining the activity of each radionuclide in a dual-label sample. A set of correlation curves is generated utilizing quench standards for both a low energy radionuclide and a high energy radionuclide. A test sample was then counted and the quench-indicating parameters for the test sample are compared with the quench-indicating parameters of the correlation curves to determine the appropriate contribution of each radionuclide to the overall energy spectra of the test sample. From this comparison the overall count rate for the test sample may be allocated between a low energy radionuclide and a high energy radionuclide. By dividing the count rates by efficiencies determined from another set of correlation curves the actual disintegration per minute (DPM) rate for each radionuclide may be ascertained.

17 Claims, 8 Drawing Figures

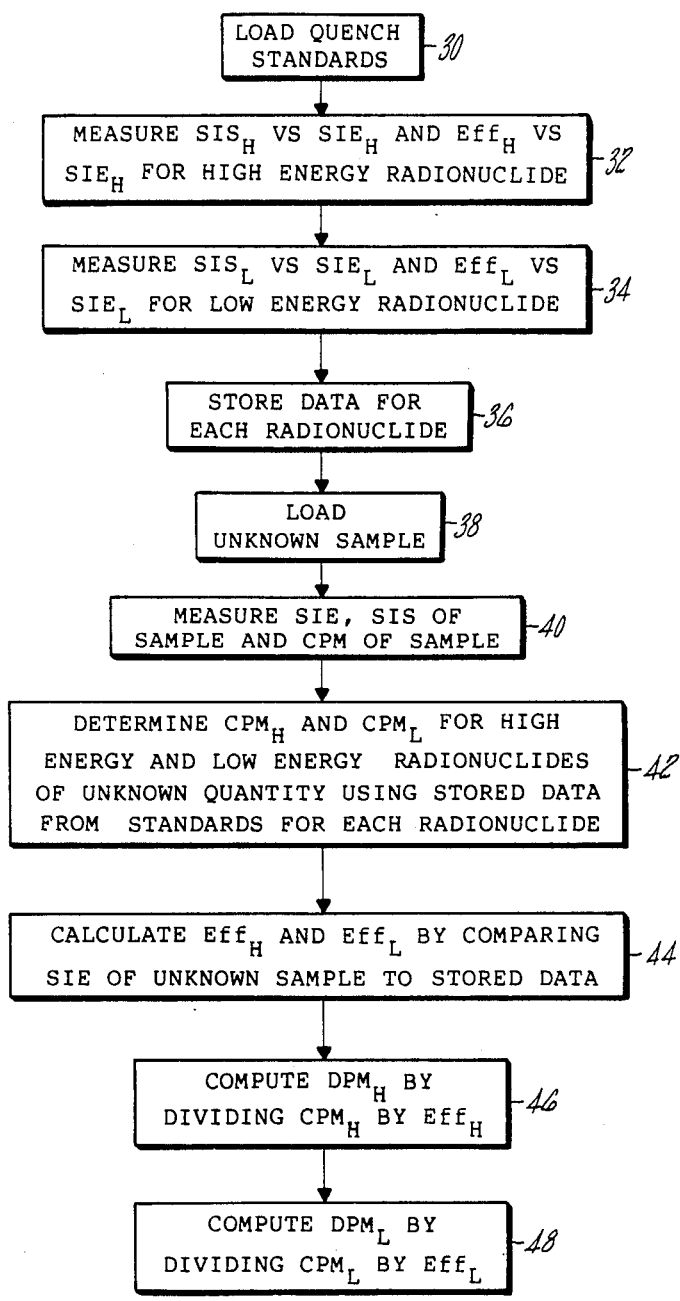

REGIONLESS MULTIPLE LABEL SCINTILLATION COUNTING

FIELD OF THE INVENTION

The invention relates to apparatus and a method useful for simultaneously determining the count rates for multiple radionuclides using a liquid scintillation counter. More specifically, the present invention is directed to regionless counting of scintillation activity to determine the radioactive characteristics of multiple radionuclides contained within a single solution.

BACKGROUND OF THE INVENTION

Liquid scintillation counting is a generally known and widely used technique for the measurement of low energy beta emitting radionuclides in addition to gamma and alpha emitters. The liquid scintillation counter is utilized to make quantitative measurements of radioactivity when incorporating a radio-labeled analyte into solution with a liquid medium capable of producing photons resulting from the kinetic interactions of nuclear decay products. There are different radionuclides, both man-made and naturally occurring, which can be experimentally employed to illustrate the molecular dynamics of a particular model by measuring their distributions in various systems. It is often desirable to use multiple radionuclides in the same experiment to follow different distributions in the same system simultaneously.

The energy of the beta particles ranges from zero energy to the $E_{max}$ for that radionuclide. A pulse height energy distribution spectrum may be recorded for the solution being analyzed. When the solution being analyzed contains a mixture of beta emitters there is an overlap of the spectra from each emitter.

Tritium has developed immense importance in various applications wherein radio-labeled components are utilized. By dissolving a sample containing the tritium in a mixture with a typical liquid scintillation cocktail, such as an aromatic solvent containing an organic scintillator, energy from the beta decay is transferred with reasonable efficiency to the scintillators which emit multiple photons proportional to energy of the beta particle. The light is detected by sensitive photomultiplier tubes. In a normal state these photomultiplier tubes have a characteristic dark noise which occurs upon the spontaneous emission of an electron within the tube. The dark noise consists of pulses generating a low intensity photon response. Thus, by utilizing multiple photomultiplier tubes and by requiring a coincidental event, beta emitters can be measured while minimizing the background. The higher the energy of the beta particle, the more photons will be produced over selected time intervals such as 20-50 nanoseconds. All photons produced within that interval are considered a pulse. The combined amplitude of the photons is known as the pulse height. The range of pulse heights is a smooth distribution of energies ranging from zero energy rising to a maximum and tailing off to the maximum energy characteristic of the beta emitting radionuclide. This distribution is known as the pulse-height energy distribution spectrum.

FIG. 1 is a graph of a simulated pulse-height energy distribution spectra for a combination of a lower energy beta emitter and a higher energy beta emitter. The cross-hatched area is that area wherein radioactive decay from beta particles emitted by both the low energy emitter and the high energy emitter contributes to the indicated spectra.

Another phenomenon of interest to a liquid scintillation user is the phenomenon of quenching. All energy created by the beta particle in reaction with the fluor is unfortunately not dissipated into the production of light. The adding of sample material to the scintillation solution introduces molecules which absorb energy and which may not be capable of producing light. The energy of the ejected beta particles, therefore, is dissipated in the excitation of solvent molecules as well as by indirect transfer of energy to obstructive sample molecules. Since some of the energy transferred to sample molecules is not utilized to produce photons of light, it is not measured by the photomultiplier tubes and not recorded. Quenching results in the spectrum of pulse amplitudes having an apparent diminished energy when compared to the theoretical spectrum for an unquenched sample.

In order to relate the actual disintegrations per minute (DPM) of the sample from the measured counts per minute (CPM) it is necessary to determine the extent to which the sample is quenched and correlate the quench level to the counting efficiency. Efficiency of the counting is determined by dividing the actually detected counts per minute (CPM) by the disintegrations per minute (DPM) and is expressed as a fraction. Hence, once the level of quenching is known it is possible to merely divide the actual counts per minute (CPM) by the efficiency fraction to determine the disintegrations per minute (DPM).

Historically, the principal method utilizing a liquid scintillation counter to determine the number of disintegrations per minute for each radionuclide in a solution containing multiple radionuclides is based upon establishing counting conditions in two different energy regions and eliminating the lower energy radionuclide contribution from the higher energy region of the sample. The higher energy radionuclide is counted above the observed maximum energy of the lower energy radionuclide. By discriminating to permit acceptance of any energy event exceeding the maximum energy level of the lower energy beta emitter, an upper level is provided to yield a window or region. This region would include all events exceeding the maximum energy level of the lower energy beta emitting radionuclide and hence would be only events generated by the higher energy beta emitting radionuclide. This region will be referred to as the higher energy region.

The relative quenching of the sample may be determined by using a quench-indicating parameter (QIP) such as the Spectral Index of the External Standard (SIE). This method involves counting the sample with a gamma radiation source adjacent the vial and subsequently in the absence of the gamma radiation source. The gamma radiation source generates Compton electrons in the sample solution which behave in a similar manner to beta particles. If quenching is present the pulse-height energy distribution spectra from the gamma radiation generated events will be compressed towards a lower apparent energy. By measuring the spectral change using a quench-indicating parameter (QIP) such as external standard ratio (ESR), Spectral Index of the External Standard (SIE); H Number, etc., one may obtain the degree of quenching.

The relationship of the degree of quenching of a sample can be equated to the counting efficiency of the higher energy beta emitting radionuclide in the higher energy region using a known series of quench standards. A similar relationship may be established for the higher energy radionuclide in the lower energy region. In like manner the efficiency of the lower energy beta emitting radionuclide may be determined for the lower energy region. Based upon the efficiency for both radionuclides and the combined count rate (CPM), the actual disintegrations per minute for each of the radionuclides may be calculated utilizing simultaneous equations.

The degree of separation of the spectra due to each of the radionuclides varies with quenching. It has been determined that it is possible to maximize nuclide separation by decreasing the energy limits for the region of the higher and lower energy radionuclides as quenching increases. The same type of data is still required for determining counting efficiency. Four plots of counting efficiency related to the quench-indicating parameter of the external standard are required. The data reduction is as set forth above.

The wider the energy region within reason the less likely instrument stability will be a problem. The limit setting for the lower region is in an area of rapidly decreasing spectral intensity for the lower energy radionuclide, hence instrument stability is of a major concern. A change in the instrument could represent a significant change in the apparent counts and efficiency.

In order to provide an improved system, the herein invention is directed towards regionless counting of the combined disintegrations per minute of both radionuclides. The invention is directed towards determining the first moment of the spectrum or mean pulse height or some other quench-indicating parameter (QIP) of a sample mixture and comparing that QIP to the known component QIPs for each of the radionuclides in the mixture at the level of quenching determined for the sample mixture. Based upon this comparison, a relative value may be determined as to the contribution of each of the two radionuclides to the total counts per minute recorded. Utilizing efficiency curves determined for each radionuclide determined from standards and knowing an appropriate sample referenced quench-indicating parameter for the sample mixture relative efficiencies for each of the radionuclides may be determined. Thereafter the disintegrations per minute (DPM) for each radionuclide may be calculated by dividing the counts per minute (CPM) by the efficiencies.

The advantages of utilizing regionless counting include that the user does not need to define an energy region for each radionuclide of interest. In other words the user does not have to determine the maximum energy of the lower energy radionuclide under the appropriate quenched condition to set a region for measuring only the counts per minute in the high energy region contributed by the high energy radionuclide. Potential user error in determining and setting the instrument for these regions is eliminated.

An advantage of utilizing regionless counting is that all the spectral information is used to determine the quench-indicating parameters and to make the desired calculations. Overall theoretical uncertainty using the total spectral information is less than theoretical uncertainty using discrete regions.

Additionally, an advantage of this scheme is that only one set of quench curves per radionuclide needs to be stored in the machine as opposed to one set of quench curves per region. Additionally the counting uncertainties associated with the discrete multiple energy region counting are reduced. The operator does not need to understand the principles involved in liquid scintillation counting to perform automatic dual-label activity measurements but may simply advise the machine to perform such function. Theoretically, more accurate measurements can be made than existing techniques since the entire spectral value information is utilized to reach the appropriate conclusion.

Additionally by using this technique the liquid scintillation counter has the capability of computing both counts per minutes (CPM) and disintegrations per minute (DPM) for individual radionuclides in single and dual-label samples. The liquid scintillation counter may also be set up to provide live time display of the individual count rates and activity levels for the dual-label samples. This scheme additionally contributes to simplified instrument design.

SUMMARY OF THE INVENTION

It is an object of the present invention to provide a liquid scintillation counter capable of determining the disintegration per minute of two radionuclides contained in a dual-label sample without setting of regions.

It is another object of the present invention to provide a method of determining the disintegrations per minute of two radionuclides contained in a dual-label sample without having to determine the maximum energy of the lower energy radionuclide in the quenched condition of the sample.

It is a still further object of the present invention to provide a liquid scintillation counter wherein the operator can determine the appropriate disintegration rate of each of the multiple radionuclides without having to set regions in the machine for discriminating between the contributions of two radionuclides.

It is another object of the present invention to provide an improved liquid scintillation counter capable of using the entire spectrum of information to minimize theoretical statistical uncertainty with each radionuclide in the dual-label samples.

These and other objects will be apparent from the description to follow and the appended claims.

The above objects are achieved according to a preferred embodiment of the invention by the provision of a liquid scintillation counting system for use with a test sample containing one or more radioactive nuclides together with a liquid scintillator such that the disintegration rate for each radionuclide may be ascertained as a function of the pulse energy distribution spectra of the sample and known standards. Transducer means for converting energy released by the decay of the radionuclides into electrical pulses proportional thereto is provided. Signal processing means are connected to the transducer means for eliminating pulses which do not fall within a predetermined time differential window thereby screening out pulses which are not related to the decay of a radionuclide. Quantizing means are provided for and are connected to the signal processing means for converting each pulse into a representative digital signal. Processing means are connected to receive the digital signals and include storage means for storing correlation curves between a quench-indicating parameter and an external source quench-indicating parameter and between the external source quench-indicating parameter and efficiency for selected radionuclides and said processing means storing data representative of an external source quench-indicating parameter of the test sample and the pulse height energy distribution spectrum generated by the decay of the radionuclides in the test sample. Said processing means also includes means to determine the relative contribution of each radionuclide to the pulse height energy distribution spectrum and the actual disintegrations per unit time for each radionuclide in the test sample.

Additionally disclosed is a regionless method for ascertaining the unknown activity of multiple known radioactive nuclides in a test sample including the steps of establishing a sample first set of correlation curves between a quench-indicating parameter and an external source quench-indicating parameter for each of the known radionuclides, storing a second set of correlation curves between an external source quench-indicating parameter and efficiency for each of the known radionuclides, determining an external source quench-indicating parameter and a count rate for the test sample, comparing the external source quench-indicating parameter of the test sample to the first set of correlation curves to determine the relative proportions that each radionuclide contribute to the total count rate for the test sample, ascertaining the efficiency for each radionuclide by comparing the measured external source quench-indicating parameter to the second set of correlation curves and calculating the unknown quantity of radionuclides by dividing the proportional count rate for the radionuclide by the efficiency value of the radionuclide from the step of ascertaining.

BRIEF DESCRIPTION OF THE DRAWINGS

FIG. 8 is a flow chart of the method steps involved in computing the disintegration rate of each radionuclide in a dual-label sample.

DESCRIPION OF THE PREFERRED EMBODIMENT

The invention will be described herein with reference to specific quench-indicating parameters for use in making the desired determination of radio-labeled compounds in the sample selected. It is to be understood that various types of quench-indicating parameters may be substituted other than the ones specifically disclosed herein.

The method and apparatus as described herein will be specifically directed toward identifying the activity of each radionuclide in dual-label samples. By dual-label sample we are referring to a test sample containing two known radioactive nuclides each existing in an unknown quantity if at all. The general principles involved herein may be useful in combination with other principles for determining triple or further labeled samples.

This invention concerns utilizing a quench-indicating parameter which may be compared to similar quench-indicating parameters for standards of the radionuclides such that a relative comparison can be made to determine the appropriate contribution of each radionuclide to the overall test sample. The quench-indicating parameters specifically referenced herein will be the Spectral Index of the Sample (SIS) and the Spectral Index of the External Standard (SIE). These are based on the first moment of the pulse contribution of the sample or the net pulse distribution of the external standard. This SIS quench-indicating parameter is determined based solely on the sample and does not depend upon any external standards.

The Spectral Index of External Standard (SIE) on the other hand is based upon the placement of an external source of gamma radiation adjacent the sample to be tested. The external source of radiation may be radium-226, cesium-137, barium-133m, or another suitable source. The external source produces gamma radiation which through the Compton effect creates a scintillation in the sample similar to the radioactive decay of the radionuclides in question. Hence, a first moment of the sample in response to the external radiation source may be determined and a number calculated indicating the degree of quenching of the sample.

Other examples of an external standard quench-indicating parameter would be the external standard ratio (ESR or ESCR), H# and ESP. Other examples of quench-indicating parameters without an external standard would be the sample channel ratio (SCR) or measurement of the endpoint of the higher energy radionuclide.

For more specific explanation of the various quench-indicating parameters, please see Section 3 of "The Principles of Operation of Liquid Scintillation Counters" submitted with the accompanying Information Disclosure Statement.

Figure 1:
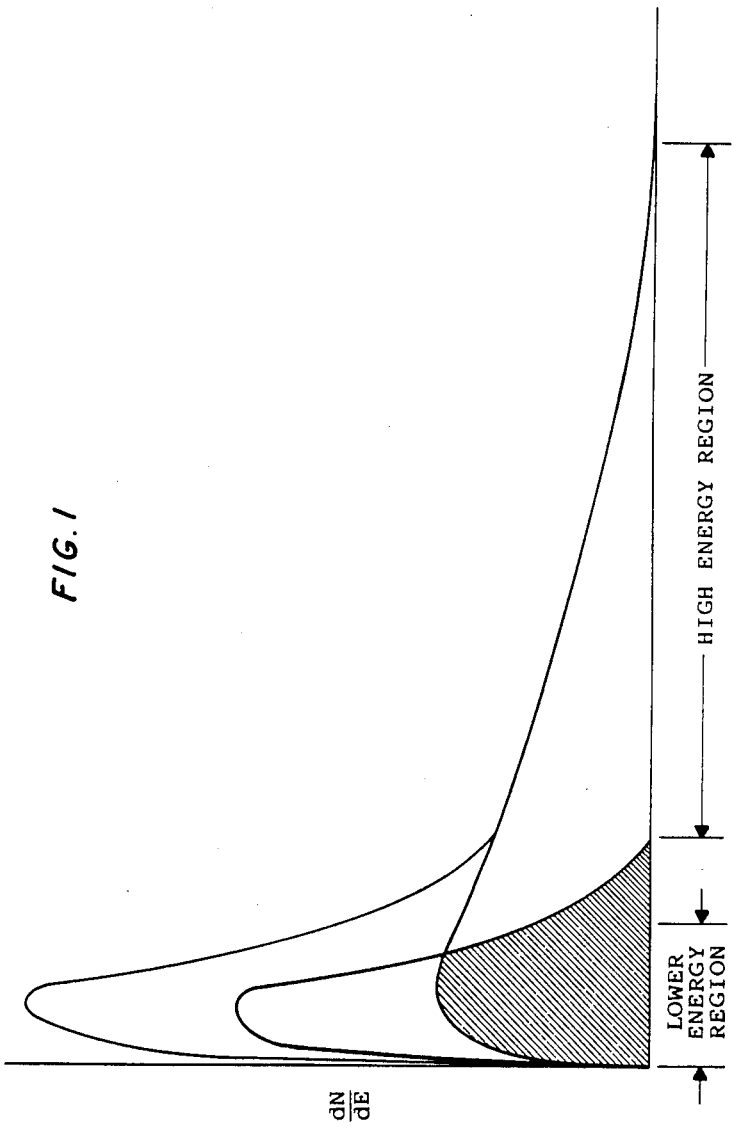
FIG. 1 is a graph of the number of counts per energy versus energy for multiple label test samples showing the contributions of each of two radionuclides.

Referring first to FIG. 1 there may be seen a graph showing the pulse height energy distribution of a test sample spectrum containing multiple radionuclides and spectra of each radionuclide. It may be seen that there is a lower energy region and a higher energy region and that, both beta emitting radionuclides contribute to energy events in the cross-hatched portion of the lower energy region and only the higher energy radionuclide contributes to the energy events in the higher energy region.

Figure 2:
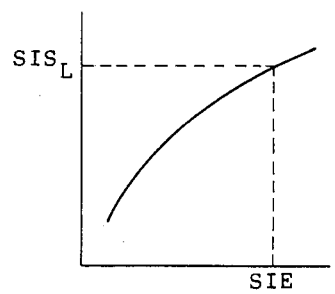
FIG. 2 is a graph of SIE versus $SIS_L$ (lower energy radionuclide).
Figure 3:
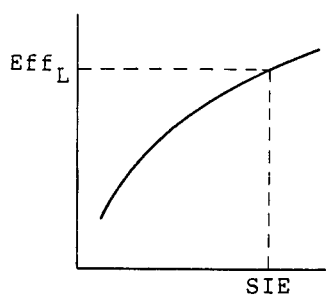
FIG. 3 is a graph of SIE versus $Eff_L$ (lower energy radionuclide).
Figure 4:
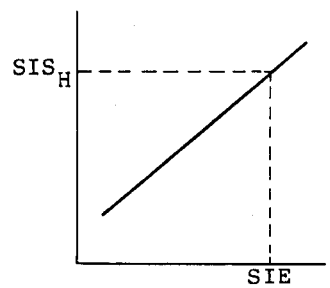
FIG. 4 is a graph of SIE versus $SIS_H$ (higher energy radionuclide).
Figure 5:
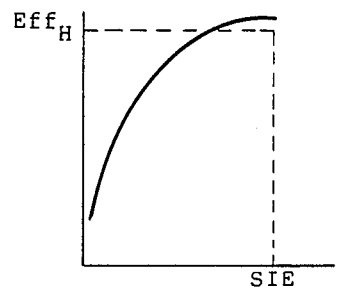
FIG. 5 is a graph of SIE versus $Eff_H$ (higher energy radionuclide).

FIGS. 2-6 disclose a series of correlation curves. FIGS. 2 and 4 disclose correlations determined by measuring the count rate and determining the Spectral Index for External Standard and the Spectral Index of the Sample for standards at varying quench levels for both the low energy radionuclide ($SIS_L$) and the high energy radionuclide ($SIS_H$). Plots are made and stored in the machine to indicate the relationship between the two. FIGS. 3 and 5 are plots of the Spectral Index of the External Standard versus the efficiency taken from standards at varying quench levels for both the high and low energy radionuclides ($Eff_H$ and $Eff_L$). These plots are likewise stored in the liquid scintillation counter.

Figure 6:
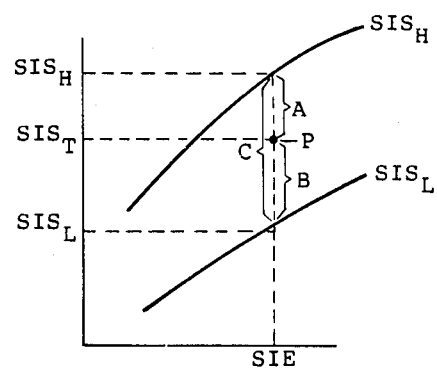
FIG. 6 is a graph of SIE versus SIS and the corresponding curves for low and high energy radionuclides.

FIG. 6 is a plot of the Spectral Index of External Standard versus the Spectral Index of the Sample wherein the curves from FIGS. 2 and 4 are plotted on a single graph.

In practice single label quench standards for each radionuclide having various degrees of quenching are utilized to establish the four curves represented in FIGS. 2-5. Once these curves are established, then the test sample is measured. The Spectral Index for External Standard is determined relative to the test sample as is the Spectral Index of the Sample. Once the Spectral Index for the External Standard and the Spectral Index of the Sample are known, a point labeled P on FIG. 6 is ascertained. Utilizing the same Spectral Index of the External Standard value, an appropriate Spectral Index of the Sample value may be determined for both the low energy radionuclide and the high energy radionuclide. It is now apparent that the point determined is somewhere between the two curves for the low and high energy radionuclides. The relationship of the point to the two curves or the relative distances therebetween is a measure of the relative proportions of the activity of each radionuclide in the sample.

As may be seen at FIG. 6, the distance from point P to the correlation curve for the high energy radionuclide is labeled A and the distance from the point P to the low energy correlation curve is labeled B. The distance between the correlation curves at the determined SIE value is labeled C. Hence, the ratio of A/C times the total count rate would be the count rate of the test samplle allocated to the high energy radionuclide, and the ratio of B/C times the total count rate for the test sample would be the count for the lower energy radionuclide.

The appropriate SIS values are labeled on the lefthand side of the graph. It may be seen that the first moment of the sample which is equivalent to the SIS value varies depending upon the radionuclide. Again, a comparison of the SIS values would be similar to measuring the distances between point P and the relative correlation curves.

Figure 7:
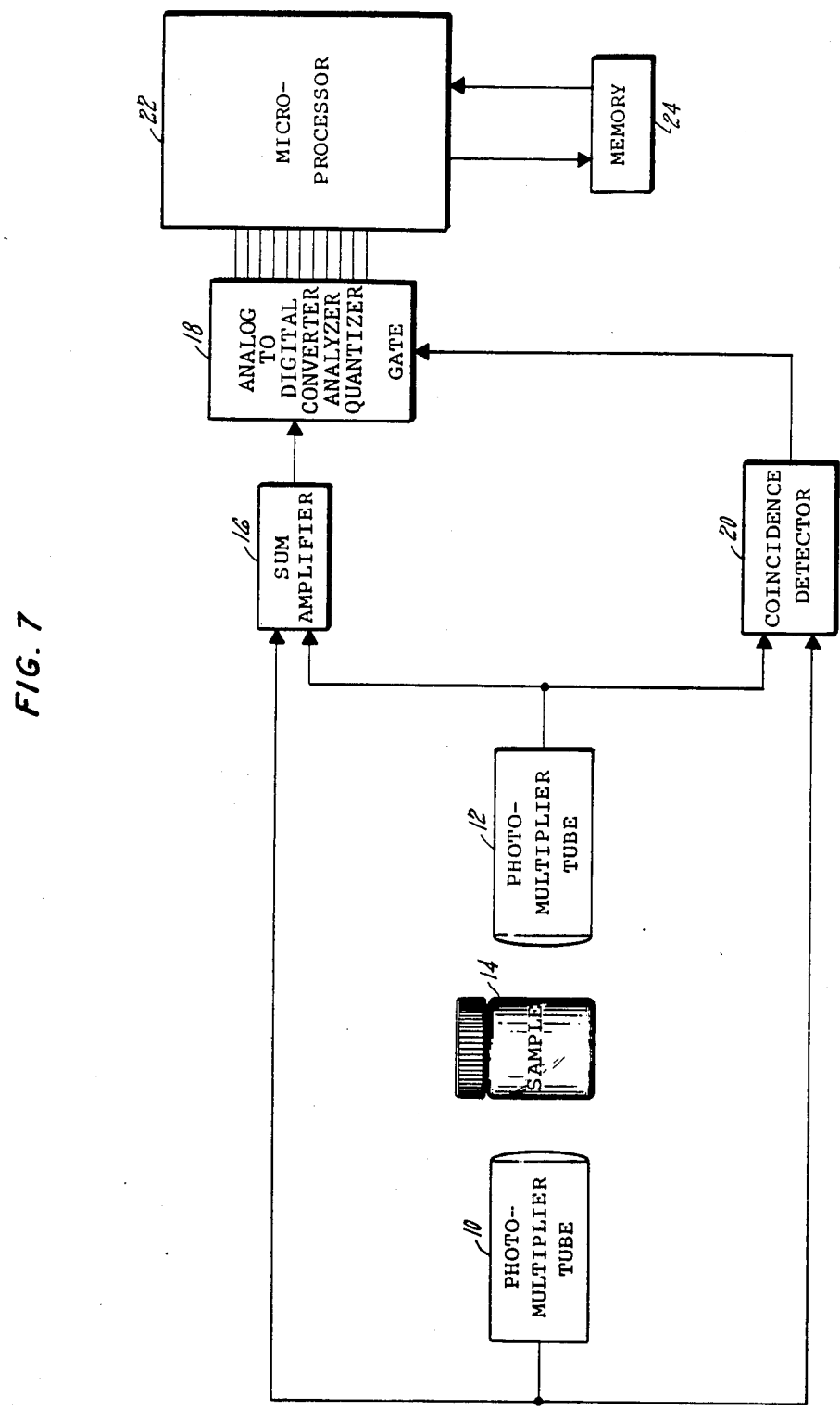
FIG. 7 is a block diagram of a liquid scintillation counter.

FIG. 7 is a block diagram of a typical electronic liquid scintillation counter. Such a counter could be a Packard Tricarb 4000 Series liquid scintillation counter. It may be seen in FIG. 7 that the system typically includes a first photomultipler tube 10 and a second photomultiplier tube 12 which are positioned with an overlapping field of view. The material to be assayed is placed in a sample container 14 which, in the counting mode, is loaded into a centrally disposed position relative to photomultiplier tubes 10 and 12. A summing amplifier 16, connected to the output of each of photomultiplier tubes 10 and 12, both combines the respective output signals and also increases the amplitude proportionately to the level observed by the photomultipler tubes. An analyzer, quantizer analog-to-digital converter 18 is connected to the output of sum amplifier 16 to quantize the signal level and to generate a digital number which identifies the specific magnitude of each received pulse. A coincidence detector 20 is provided to distinguish a scintillation event related to the radionuclide disintegration from unwanted background events. In operation the coincident detector receives pulses from both photomultiplier tubes 10 and 12 and measures the time difference between the received pulses. If the second pulse is received within a predetermined length of time, or time differential window of the first, such an event is concluded to be related to the radioactive decay event. An enable signal is presented to the analog-to-digital converter 18 to simultaneously gate the combined pulse through to microprocessor 22. Of course, if a pulse is not received at each input of the coincidence detector within this time window the analog-to-digital converter is not enabled so that no scintillation event is counted.

The digital number representing the counted nuclear event is received by microprocessor 22 and stored in memory 24 for subsequent use. Those skilled in the art will appreciate the aforegoing description is general in nature and could describe a number of different scintillation counting systems.

FIG. 8 is a flow chart of the various steps involved in making the disintegration per minute (DPM) calculations for the separate radionuclide in the test sample. Therein the flow chart begins at step 30 wherein quench standards are loaded in the machine. At step 32 the quench standards are measured to determine the SIS and SIE values of the high energy radionuclide as well as the efficiency of the high energy radionuclide versus the SIE values. At step 34 the same values are measured for the low energy radionuclide. At step 36 the information collected from steps 32 and 34 is stored in the device. At step 38 the unknown sample is loaded and thereafter in step 40 the SIE and SIS values of the sample as well as the total counts per minute of the sample are recorded.

At step 42 the counts per minute for the low and high energy radionuclides are calculated utilizing the stored information and the standards for each radionuclide. At steps 44 the appropriate efficiency values for the high and low energy radionuclides are determined by comparing the Spectral Index of the External Standard of the unknown sample to the stored data from steps 32 and 34. At steps 46 and 48 the disintegrations per minute for high energy and low energy radionuclides are each calculated by dividing the appropriate counts per minute for that radionuclide by the efficiency as determined in step 44. Hence, at this step the disintegrations per minute (DPM) for each radionuclide are determined. These steps can be accomplished in varying order.

The following is one potential set of equations which may be solved at step 42 to determine the appropriate count rates for each of the high and low energy radionuclides:

$$CPM_L = \frac{SIS_H - SIS_T}{SIS_H - SIS_L} \cdot CPM_T$$

$$CPM_H = \frac{SIS_T - SIS_L}{SIS_H - SIS_L} \cdot CPM_T$$

wherein $SIS_H$ is the Spectral Index of the Sample for the higher energy radionuclide;

$SIS_L$ is the Spectral Index of the Sample for the lower energy radionuclide;

$SIS_T$ is the Spectral Index of the Sample for the test sample;

$CPM_T$ is the counts per minute for the test sample;

$CPM_H$ is the counts per minute for the higher energy radionuclide; and $CPM_L$ is the counts per minute for the lower energy radionuclide.

$SIS_H$, $SIS_L$ and $SIS_T$ are determined based upon the stored correlation curves and the measured SIS of the test sample.

Once the counts per minute for each of the radionuclides are determined then the disintegrations per minute (DPM) may be determined by the following equations:

$$DPM_L = CPM_L/Eff_L$$

$$DPM_H = CPM_H/Eff_H$$

wherein $DPM_L$=disintegrations per minute for lower energy radionuclide;
$Eff_L$=efficiency of lower energy radionuclide;
$DPM_H$=disintegrations per minute for higher energy radionuclide; and
$Eff_H$=efficiency of higher energy radionuclide.

Although the specific calculations may be utilized to determine the appropriate contribution of each the radionuclides to the overall energy spectra from the sample, other equations are additionally feasible. One other set of equations simply compares the distance on the graph and would be as follows:

$$CPM_L = (A/C) \cdot CPM_T$$

$$CPM_H = (B/C) \cdot CPM_T$$

wherein $CPM_L$=counts per minute for the lower energy radionuclide;
$CPM_H$=counts per minute for the higher energy radionuclide;
$CPM_T$=counts per minute for the test sample;
A=distance from the measured point to the SIS correlation curve for the high energy radionuclide;
B=distance from the measured point to the SIS correlation curve for the low energy radionuclide; and
C=A+B=distance between the SIS correlation curves of the low and high energy radionuclides.

The invention has been described herein with reference to specific apparatus and a method for achieving the end result. It is to be understood that although specific quench-indicating parameters are mentioned, other quench-indicating parameters could be equally suitable. One parameter thought to be particularly suitable in addition to measuring the first moment of the sample would be the high energy radionuclide endpoint. (Note if high energy radionuclide is statistically insignificant, then the endpoint of the lower energy radionuclide would be suitable.) Naturally, since the first moment of the sample is related to SIS, the measurement of the first moment of the sample over the energy spectrum would be an equivalent quench-indicating parameter.

The use of the high energy radionuclide endpoint as a QIP instead of SIE allows the use of an external standard to be eliminated. To use the endpoint as a QIP, correlation curves are established using known quench standards between efficiency and endpoint for the low energy radionuclide, efficiency and endpoint for the high energy radionuclide, endpoint for the low energy radionuclide versus endpoint for the high energy radionuclide and endpoint of the high energy radionulcide versus SIS for the high energy radionuclide or endpoint of the low energy radionuclide versus SIS for the low energy radionuclide.

Since the endpoint of the sample is measured the SIS for the high energy radionuclide can be determined from the appropriate correlation curve. Once SIS for the high energy radionuclide is determined, the SIS for the low energy radionuclide can be determined. SIS total for the sample is measured as is the counts per minute (CPM) for the sample. With this information the first set of equations above can be solved for the CPM for each of the high energy radionuclide ($CPM_H$) and the low energy radionuclide ($CPM_L$).

The efficiencies for the low and high energy radionuclides can be determined from the correlation curves between efficiency and the known SIS values for the high and low energy radionuclides. The disintegrations per minute (DPM) for each of the low and high energy radionuclides can then be determined by dividing the CPM for the radionuclide by the efficiency for that radionuclide.

The invention has been described with reference to a particular embodiment. It is to be understood by those skilled in the art that modifications and variations can be effected within the spirit and scope of the invention.

I claim:

1. A liquid scintillation counting system for use with a test sample containing one or more radioactive nuclides together with a liquid scintillator such that the disintegration rate for each radionuclide may be ascertained as a function of the pulse energy distribution spectra of the sample and known standards which comprises:

transducer means for converting the energy released by the decay of the radionuclides into electrical pulses proportional thereto;

signal processing means connected to said transducer means for eliminating pulses which do not fall within a predetermined time differential window thereby screening out pulses which are not related to the decay of a radionuclide;

quantizing means connected to the signal processing means for converting each pulse into a representative digital signal; and processing means connected to receive the digital signals from the quantizing means, said processing means including storage means for storing correlation curves between a first quench-indicating parameter and a second quench-indicating parameter and between the second quench-indicating parameter and efficiency for selected radionuclides and said processing means storing data representative of a second quench-indicating parameter of the test sample and the pulse energy distribution spectrum generated by the decay of the radionuclides in the test sample, and said processing means including means to determine the relative contribution of each radionuclide to the pulse energy distribution spectrum of the test sample and the actual disintegrations per unit time for each radionuclide in the test sample.

2. The apparatus as set forth in claim 1 wherein the processing means stores and processes the digital signals used to determine the first quench-indicating parameter and the second quench-indicating parameter without grouping the signals by energy regions.

3. The apparatus as set forth in claim 1 wherein the means to determine the relative contribution of each radionuclide to the pulse energy distribution spectrum uses a parameter based on pulses generated over the entire spectrum monitored.

4. The apparatus as set forth in claim 3 wherein the first quench-indicating parameter is the Spectral Index of the Sample (SIS) and the second quench-indicating parameter is the Spectral Index of the External Standard (SIE).

5. The apparatus as set forth in claim 1 wherein the second quench-indicating parameter is the endpoint of the higher energy radionuclide.

6. The apparatus as set forth in claim 4 wherein the means to determine the relative contribution of each radionuclide to the energy contribution solves the following simultaneous equations:

$$CPM_L = \frac{SIS_H - SIS_T}{SIS_H - SIS_L} \cdot CPM_T$$

$$CPM_H = \frac{SIS_T - SIS_L}{SIS_H - SIS_L} \cdot CPM_T$$

wherein $SIS_H$ is the Spectral Index of the Sample for a higher energy radionuclide;

$SIS_L$ is the Spectral Index of the Sample for a lower energy radionuclide;

$SIS_T$ is the Spectral Index of the Sample for the test sample;

$CPM_T$ is the counts per minute from the test sample;

$CPM_H$ is the counts per minute from the higher energy radionuclide;

$CPM_L$ is the counts per minute from the lower energy radionuclide; and wherein $SIS_H$, $SIS_L$ and $SIS_T$ are determined based on the stored correlation curves and the measured SIS of the test sample.

7. The apparatus as set forth in claim 6 wherein the means to determine the actual disintegrations per unit time includes means for determining the efficiency of the appropriate radionuclide by comparing the stored correlation curve with the measured SIE of the test sample and thereafter by solving the following equations:

$$DPM_L = CPM_L/Eff_L$$

$$DPM_H = CPM_H/Eff_H$$

wherein $DPM_L$=disintegrations per minute for lower energy radionuclide;

$Eff_L$=efficiency of lower energy radionuclide;

$DPM_H$=disintegrations per minute for higher energy radionuclide; and $Eff_H$=efficiency of higher energy radionuclide.

8. The apparatus as set forth in claim 1 wherein the first quench-indicating parameter is a measure of the first moment of the sample such as the Spectral Index of the Sample (SIS), wherein the second quench-indicating parameter is an external source quench-indicating parameter such as the Spectral Index of the External Standard (SIE), and wherein the means to determine the relative contribution of each radionuclide to the overall pulse includes means for determining the relative proportions between a point determined by the measured SIS and SIE of the test sample and the correlation curves for each radionuclide at the same SIE value.

9. The apparatus as set forth in claim 8 wherein the means to determine the relative contribution soles the following equations:

$$CPM_L = (A/C) \cdot CPM_T$$

$$CPM_H = (B/C) \cdot CPM_T$$

wherein $CPM_L$=counts per minute for the lower energy radionuclide;

$CPM_H$=counts per minute for the higher energy radionuclide;

$CPM_T$=counts per minute for the test sample;

A=distance from the measured point to the SIS correlation curve for the high energy radionuclide;

B=distance from the measured point to the SIS correlation curve for the low energy radionuclide; and C=A+B=distance between the SIS correlation curves of the low and high energy radionuclides.

10. A regionless method for ascertaining the unknown quantity of multiple known radioactive nuclides in a test sample which comprises the steps of:

establishing a first set of correlation curves between a first quench-indicating parameter and a second quench-indicating parameter for each of the known radionuclides;

storing a second set of correlation curves between the second quench-indicating parameter and efficiency for each of the known radionuclides;

determining a second quench-indicating parameter and a count rate for the test sample;

comparing the second quench-indicating parameter of the test sample to the first set of correlation curves to determine the relative proportions that each radionuclide contributes to the count rate for the test sample;

ascertaining the efficiency for each radionuclide by comparing the measured second quench-indicating parameter of the sample to the second set of correlation curves; and calculating the unknown quantity of each radionuclide by dividing the proportional count rate for the radionuclide by the efficiency value for the radionuclide from the step of ascertaining.

11. The method as set forth in claim 10 wherein the step of establishing includes the first quench-indicating parameter being the Spectral Index of Sample (SIS) and the second quench-indicating parameter being an external source quench-indicating parameter such as the Spectral Index of the External Standard (SIE).

12. The method as set forth in claim 11 wherein the step of determining includes measuring the SIS and SIE values for the test sample and the step of comparing further comprises comparing the SIS value of the test sample to the SiS value of a higher energy radionuclide and a lower energy radionuclide at the same SIE value to determine the relative proportions of each radionuclide in the test sample.

13. The method as set forth in claim 12 wherein the step of comparing further comprises determining the count rate for each radionuclide by solving the following equations:

$$CPM_L = \frac{SIS_H - SIS_T}{SIS_H - SIS_L} \cdot CPM_T$$

$$CPM_H = \frac{SIS_T - SIS_L}{SIS_H - SIS_L} \cdot CPM_T$$

wherein $SIS_H$ is the Spectral Index of the Sample for the higher energy radionuclide;

$SIS_L$ is the Spectral Index of the Sample for the lower energy radionuclide;

$SIS_T$ is the Spectral Index of the Sample for the test sample;

$CPM_T$ is the counts per minute from the test sample;

$CPM_H$ is the counts per minute from the higher energy radionuclide; and $CPM_L$ is the counts per minute from the lower energy radionuclide.

14. The method as set forth in claim 13 wherein the step of calculating the unknown activity of each radionuclide further comprises calculating the actual disintegrations per minute (DPM) for each radionuclide by solving the following equations:

$$DPM_L = CPM_L/Eff_L$$

$$DPM_H = CPM_H/Eff_H$$

wherein $DPM_L$=disintegrations per minute for the lower energy radionuclide;
$Eff_L$=efficiency of the lower energy radionuclide;
$DPM_H$=disintegrations per minute for the higher energy radionuclide; and
$Eff_H$=efficiency of the higher energy radionuclide.

15. The method as set forth in claim 10 wherein the step of establishing a first set of correlation curves further comprises establishing the endpoint of the higher energy radionuclide as the second quench-indicating parameter.

16. The method as set forth in claim 12 wherein a measured point is determined by the measure SIS and SIE of the test sample, and the step of comparing further comprises solving the following equations:

$$CPM_L = (A/C) \cdot CPM_T$$

$$CPM_H = (B/C) \cdot CPM_T$$

wherein $CPM_L$=counts per minute for a lower energy radionuclide;
$CPM_H$=counts per minute for a higher energy radionuclide;
$CPM_T$=counts per minute for the test sample;
A=distance from measured point to SIS correlation curve for high energy radionuclide;
B=distance from measured point to SIS correlation curve for low energy radionuclide; and
C=A+B=distance between SIS correlation curves of low and high energy radionuclides.

17. The method as set forth in claim 10 wherein the step of determining further comprises determining a second quench-indicating parameter for the test sample over the entire energy range for the known radionuclides.

* * * * *